(12) United States Patent
Goering et al.

(10) Patent No.: US 8,079,387 B2
(45) Date of Patent: Dec. 20, 2011

(54) PI-SHAPED PREFORM

(75) Inventors: Jonathan Goering, York, ME (US); Kenneth Ouellette, Kennebunk, ME (US)

(73) Assignee: Albany Engineered Composites, Inc., Rochester, NH (US)

( * ) Notice: Subject to any disclaimer, the term of this patent is extended or adjusted under 35 U.S.C. 154(b) by 543 days.

(21) Appl. No.: 12/260,743

(22) Filed: Oct. 29, 2008

(65) Prior Publication Data

US 2010/0105269 A1   Apr. 29, 2010

(51) Int. Cl.
*D03D 13/00* (2006.01)
*D03D 11/02* (2006.01)
*D03D 41/00* (2006.01)

(52) U.S. Cl. .............. 139/11; 139/383 R; 139/DIG. 1

(58) Field of Classification Search .............. None
See application file for complete search history.

(56) References Cited

U.S. PATENT DOCUMENTS

| | | | |
|---|---|---|---|
| 4,256,790 A | 3/1981 | Lackman et al. |
| 4,331,349 A | 5/1982 | Funahashi |
| 4,331,495 A | 5/1982 | Lackman et al. |
| 4,922,968 A | 5/1990 | Bottger et al. |
| 5,085,252 A | 2/1992 | Mohamed et al. |
| 5,429,853 A | 7/1995 | Darrieux |
| 5,772,821 A | 6/1998 | Yasui et al. |
| 5,783,279 A | 7/1998 | Edgson et al. |
| 5,785,094 A | 7/1998 | Yoshida |
| 5,899,241 A | 5/1999 | David et al. |
| 6,010,652 A | 1/2000 | Yoshida |
| 6,019,138 A | 2/2000 | Malek et al. |
| 6,103,337 A | 8/2000 | Burgess |
| 6,283,168 B1 | 9/2001 | Gu et al. |
| 6,374,570 B1 | 4/2002 | McKague, Jr. |
| 6,418,973 B1 | 7/2002 | Cox et al. |
| 6,446,675 B1 * | 9/2002 | Goering ..................... 139/11 |
| 6,520,706 B1 * | 2/2003 | McKague et al. ........... 403/265 |
| 6,589,472 B1 | 7/2003 | Benson et al. |
| 6,676,882 B2 | 1/2004 | Benson et al. |
| 6,712,099 B2 | 3/2004 | Schmidt et al. |
| 6,718,713 B2 | 4/2004 | McKague, Jr. et al. |

(Continued)

FOREIGN PATENT DOCUMENTS

WO   WO 02/16197 A   2/2002

(Continued)

OTHER PUBLICATIONS

International Search Report and Written Opinion from European Patent Office for corresponding international application PCT/US2009/062159 mailed Jan. 27, 2010.

*Primary Examiner* — Bobby Muromoto, Jr.

(74) *Attorney, Agent, or Firm* — Frommer Lawrence & Haug LLP; Ronald R. Santucci

(57) ABSTRACT

A woven preform for a reinforced composite material, which may be woven flat and folded into shape. The preform has a three-dimensional weave architecture with weft fibers woven to provide layer-to-layer interlocking of layers of warp fiber as well as interlocking of fibers within each layer. One or more legs extend from a base, the base and legs each having at least two layers of warp fibers. The legs may be parallel or angled to each other and/or may move along a sine wave in the warp and/or weft direction. The outer ends of the base and/or the legs preferably have tapers formed from terminating layers of warp fibers in a stepped pattern.

46 Claims, 12 Drawing Sheets

U.S. PATENT DOCUMENTS

| | | | |
|---|---|---|---|
| 6,733,211 B1 | 5/2004 | Durie | |
| 6,733,862 B2 * | 5/2004 | Goering | 428/121 |
| 6,821,368 B2 | 11/2004 | Benson et al. | |
| 6,835,261 B2 | 12/2004 | Schmidt | |
| 6,874,543 B2 | 4/2005 | Schmidt et al. | |
| 6,890,612 B2 * | 5/2005 | Goering | 428/57 |
| 6,899,941 B2 * | 5/2005 | Goering et al. | 428/121 |
| 6,913,045 B2 | 7/2005 | Fantino et al. | |
| 7,014,805 B1 * | 3/2006 | Reis et al. | 264/138 |
| 7,045,084 B1 * | 5/2006 | Reis et al. | 264/138 |
| 7,077,167 B2 | 7/2006 | Nayfeh et al. | |
| 7,198,692 B2 | 4/2007 | Bersuch et al. | |
| 7,244,487 B2 | 7/2007 | Brantley et al. | |
| 7,413,999 B2 * | 8/2008 | Goering | 442/181 |
| 7,655,581 B2 * | 2/2010 | Goering | 442/205 |
| 7,670,969 B2 * | 3/2010 | Blackden et al. | 442/239 |
| 7,712,488 B2 * | 5/2010 | Goering et al. | 139/384 R |
| 7,713,893 B2 * | 5/2010 | Goering | 442/246 |
| 2002/0081416 A1 * | 6/2002 | Goering | 428/121 |
| 2002/0081925 A1 * | 6/2002 | Goering | 442/215 |
| 2002/0081926 A1 * | 6/2002 | Goering et al. | 442/218 |
| 2002/0090874 A1 | 7/2002 | McKague, Jr. et al. | |
| 2002/0192450 A1 | 12/2002 | Schmidt et al. | |
| 2003/0041948 A1 | 3/2003 | Bersuch et al. | |
| 2003/0056847 A1 | 3/2003 | Schmidt et al. | |
| 2003/0116267 A1 | 6/2003 | Sheahen et al. | |
| 2004/0023581 A1 | 2/2004 | Bersuch et al. | |
| 2006/0121809 A1 * | 6/2006 | Goering | 442/246 |
| 2007/0120288 A1 | 5/2007 | Ashton et al. | |
| 2008/0009210 A1 * | 1/2008 | Goering | 442/181 |
| 2008/0261474 A1 * | 10/2008 | Goering | 442/195 |
| 2009/0149100 A1 * | 6/2009 | Goering | 442/203 |
| 2009/0163100 A1 * | 6/2009 | Goering | 442/205 |
| 2009/0202763 A1 * | 8/2009 | Rose et al. | 428/36.1 |
| 2009/0247034 A1 * | 10/2009 | Goering et al. | 442/206 |
| 2009/0311462 A1 * | 12/2009 | Goering | 428/99 |
| 2009/0325443 A1 * | 12/2009 | Blackden et al. | 442/203 |
| 2010/0105268 A1 * | 4/2010 | Ouellette et al. | 442/203 |
| 2010/0105269 A1 * | 4/2010 | Goering et al. | 442/205 |
| 2010/0167007 A1 * | 7/2010 | Goering | 428/124 |

FOREIGN PATENT DOCUMENTS

| | | |
|---|---|---|
| WO | WO 02/066235 A | 8/2002 |

* cited by examiner

PI-SHAPED PREFORM

CROSS-REFERENCE TO RELATED APPLICATIONS

Related applications are U.S. patent application Ser. No. 12/059,060 filed Mar. 31, 2008 and U.S. patent application Ser. No. 12/260,689 filed Oct. 29, 2008.

BACKGROUND OF THE INVENTION

1. Field of the Invention

This invention generally relates to woven preforms and particularly relates to woven preforms used in reinforced composite materials, which can be woven flat and folded into its final shape.

2. Incorporation by Reference

All patents, patent applications, documents, references, manufacturer's instructions, descriptions, product specifications, and product sheets for any products mentioned herein are incorporated herein by reference, and may be employed in the practice of the invention.

3. Description of the Prior Art

The use of reinforced composite materials to produce structural components is now widespread, particularly in applications where their desirable characteristics are sought of being light in weight, strong, tough, thermally resistant, self-supporting and adaptable to being formed and shaped. Such components are used, for example, in aeronautical, aerospace, satellite, recreational (as in racing boats and autos), and other applications.

Typically such components consist of reinforcement materials embedded in matrix materials. The reinforcement component may be made from materials such as glass, carbon, ceramic, aramid, polyethylene, and/or other materials which exhibit desired physical, thermal, chemical and/or other properties, chief among which is great strength against stress failure. Through the use of such reinforcement materials, which ultimately become a constituent element of the completed component, the desired characteristics of the reinforcement materials, such as very high strength, are imparted to the completed composite component. The constituent reinforcement materials typically, may be woven, knitted or otherwise oriented into desired configurations and shapes for reinforcement preforms. Usually particular attention is paid to ensure the optimum utilization of the properties for which the constituent reinforcing materials have been selected. Usually such reinforcement preforms are combined with matrix material to form desired finished components or to produce working stock for the ultimate production of finished components.

After the desired reinforcement preform has been constructed, the preform may be impregnated in the matrix material, so that typically the reinforcement preform becomes encased in the matrix material and matrix material fills the interstitial areas between the constituent elements of the reinforcement preform. The matrix material may be any of a wide variety of materials, such as epoxy, polyester, vinyl-ester, ceramic, carbon and/or other materials, which also exhibit desired physical, thermal, chemical, and/or other properties. The materials chosen for use as the matrix may or may not be the same as that of the reinforcement preform and may or may not have comparable physical, chemical, thermal or other properties. Typically, however, they will not be of the same materials or have comparable physical, chemical thermal or other properties, since a usual objective sought in using composites in the first place is to achieve a combination of characteristics in the finished product that is not attainable through the use of one constituent material alone. So combined, the reinforcement preform and the matrix material may then be cured and stabilized in the same operation by thermosetting or other known methods, and then subjected to other operations toward producing the desired component. It is significant to note at this point that after being so cured, the then solidified masses of the matrix material normally are very strongly adhered to the reinforcing material (e.g., the reinforcement preform). As a result, stress on the finished component, particularly via its matrix material acting as an adhesive between fibers, may be effectively transferred to and borne by the constituent material of the reinforcement preform.

Frequently, it is desired to produce components in configurations that are other than such simple geometric shapes as (per se) plates, sheets, rectangular or square solids, etc. A way to do this is to combine such basic geometric shapes into the desired more complex forms. One such typical combination is made by joining reinforcement preforms made as described above at an angle (typically a right-angle) with respect to each, other. Usual purposes for such angular arrangements of joined reinforcement preforms are to create a desired shape to form a reinforcement preform that includes one or more end walls or "T" intersections for example, or to strengthen the resulting combination of reinforcement preforms and the composite structure which it produces against deflection or failure upon it being exposed to exterior forces, such as pressure or tension. In any case, a related consideration is to make each juncture between the constituent components as strong as possible. Given the desired very high strength of the reinforcement preform constituents per se, weakness of the juncture becomes, effectively, a "weak link" in a structural "chain."

An example of an intersecting configuration is set forth in U.S. Pat. No. 6,103,337, the disclosure of which is incorporated herein by reference. This reference sets forth an effective means of joining together two reinforcing plates into a T-form.

Various other proposals have been made in the past for making such junctures. It has been proposed to form and cure a panel element and an angled stiffening element separate from each other, with the latter having a single panel contact surface or being bifurcated at one end to form two divergent, co-planar panel contact surfaces. The two components are then joined by adhesively bonding the panel contact surface (s) of the stiffening element to a contact surface of the other component using thermosetting adhesive or other adhesive material. However, when tension is applied to the cured panel or the skin of the composite structure, loads at unacceptably low values resulted in "peel" forces which separate the stiffening element from the panel at their interface since the effective strength of the joint is that of the matrix material and not of the adhesive.

The use of metal bolts or rivets at the interface of such components is unacceptable because such additions at least partially destroy and weaken the integrity of composite structures themselves, add weight, and introduce differences in the coefficient of thermal expansion as between such elements and the surrounding material.

Other approaches to solving this problem have been based on the concept of introducing high strength fibers across the joint area through the use of such methods as stitching one of the components to the other and relying upon the stitching thread to introduce such strengthening fibers into and across the juncture site. One such approach is shown in U.S. Pat. No. 4,331,495 and its divisional counterpart, U.S. Pat. No. 4,256, 790. These patents disclose junctures having been made between a first and second composite panel made from adhesively bonded fiber plies. The first panel is bifurcated at one end to form two divergent, co-planar panel contact surfaces in the prior art manner, that have been joined to the second panel by stitches of uncured flexible composite thread through both panels. The panels and thread have then been "co-cured," i.e. cured simultaneously. Another method to improve upon junction strength is set forth in U.S. Pat. No. 5,429,853.

While the prior art has sought to improve upon the structural integrity of the reinforced composite and has achieved success, particularly in the case of U.S. Pat. No. 6,103,337, there exists a desire to improve thereon or address the problem through an approach different from the use of adhesives or mechanical coupling. In this regard, one approach might be by creating a woven three dimensional ("3D") structure by specialized machines. However, the expense involved is considerable and rarely is it desirable to have a weaving machine directed to creating a simple structure. Despite this fact, 3D preforms which can be processed into fiber reinforced composite components are desirable because they provide increased strength relative to conventional two dimensional laminated composites. These preforms are particularly useful in applications that require the composite to carry out-of-plane loads. However, the prior-art preforms discussed above have been limited in their ability to withstand high out-of-plane loads, to be woven in an automated loom process, and to provide for varying thickness of portions of the preform.

Another approach would be to weave a two dimensional ("2D") structure and to fold it into 3D shape. However, this typically results in parts that distort when the preform is folded. The distortion occurs because the lengths of fiber as-woven are different than what they should be when the preform is folded. This causes dimples and ripples in areas where the as-woven fiber lengths are too short, and buckles in the areas where fiber lengths are too long. An example of a 3D preform weave architecture, which may lead to ripples or loops in areas where the preform is folded, is disclosed in U.S. Pat. No. 6,874,543, the entire content of which is incorporated herein by reference. Fiber preforms with specific structural shapes, such as for example 'T', 'I', 'H' or 'Pi' cross sections, can be woven on a conventional shuttle loom, and several existing patents describe the method of weaving such structures (U.S. Pat. No. 6,446,675 and U.S. Pat. No. 6,712,099, for example). In all prior art, however, the preforms have been constructed so that the cross-section is uniform in the direction of the warp and weft fiber, i.e. the points of intersection between the flange and upstanding legs are always at the same positions across the width and length of the preform.

SUMMARY OF THE INVENTION

In applications where a more complex shape is required, there may be a need for methods and systems to create preforms having different cross-sections in the direction of warp and/or weft fibers. Some applications may require the flanges or legs in the preforms to move in the direction of warp and/or weft fibers in order to form these complex shapes.

The invention is a method for weaving a fiber preform with multiple legs such that the legs are not necessarily linear in warp and/or weft direction. An exemplary embodiment of the invention is a 'Pi' preform with sine wave legs, i.e. the upstanding legs move along the warp and/or weft direction in a sinusoidal fashion.

The sine wave is created, for example, by selectively dropping some warp fibers out of the parts of the preform that form one of the upstanding legs, while simultaneously adding warp fibers in the other upstanding leg. For instance, to move the legs to the left in the weft direction, warp fibers are dropped out at the base of one of the upstanding legs and simultaneously added at the base of the adjacent upstanding leg. Similarly, the opposite may be done to move the legs to the right.

The instant method can also be used for making other cross-sectional shapes such as a 'T' shape or 'T' stiffener that has the blade of the 'T' running in a sinusoidal fashion relative to the top of the 'T' or other shapes such as preforms having three or more legs.

The instant method can be used to weave preforms with variable thickness or variable length or height legs that may be parallel or angled to each other. The legs of the preform may be separated by a uniform width clevis or a variable width clevis. The preform can be woven using any convenient pattern for the warp fiber, i.e., ply-to-ply, through thickness angle interlock, orthogonal, etc. While carbon fiber is preferred, the invention is applicable to practically any other fiber type, such as for example, glass, ceramic, aramid, polyethylene, polypropylene etc.

It is therefore an object of the invention to provide for a 3D woven preform with one or more upstanding legs such that the legs are not necessarily linear in the warp and/or weft direction.

It is another object of the invention to provide for a 3D woven preform with two or more upstanding legs with a variable width clevis between the legs.

It is a further object of the invention to provide for a 3D woven preform which is of a design which is an alternative to and/or an improvement on existing preforms and/or reinforced composite structures heretofore available.

It is a further object of the invention to provide for an integrally woven 3D preform which may be folded into shape without distortion of the fibers comprising the preform.

It is yet another object of the invention to provide for an integrally woven 3D preform which is particularly useful in forming Pi-shaped or T-shaped reinforced composites.

These and other objects and advantages are achieved by providing for a woven 3D preform that can be woven flat and then folded into its final shape prior to impregnation of resin without producing an undesirable distortion in the fibers. This is accomplished by adjusting the length of the fibers during weaving such that the fibers lengths are equalized when the preform is folded into shape providing for a smooth transition at the fold. This technique, while particularly suited for forming Pi-shaped woven preforms, may be utilized with various other shapes, such as for example, 'T' shape or preforms with three or more upstanding legs.

One embodiment of the invention is a preform for mechanical or structural joints having a three-dimensional weave architecture with weft fibers woven to provide layer-to-layer interlocking of layers of warp fiber as well as interlocking of fibers within each layer. Although exemplary embodiments described herein involve layer-to-layer interlocking, this is not necessary for the practice of the invention. Some of the layers of the preform may be without layer-to-layer interlocking. The woven preform transfers out-of-plane loading through directed fibers to minimize inter-laminar tension. The preform has a base and one or more legs extending from the base, the base and one or more legs each having at least two layers of warp fibers.

The weft fibers follow a weave sequence that carries them through a portion of the base, then into the legs, and finally through the opposite portion of the base. The legs can be connected at a symmetrical or asymmetrical, distributed-column intersection, with an even or odd number of columns of warp fibers being located between the legs. The preform may have equal or unequal leg lengths and/or heights. The legs may be perpendicular or non-perpendicular or angled to the base. The legs may be parallel or angled to each other, and/or may have a variable width clevis in between. One or more legs may move in a sinusoidal, zig-zag, diagonal, curved or non-linear fashion in the warp and/or weft direction. The outer ends of the base and/or the legs preferably have tapers formed from terminating layers of warp fibers in a stepped pattern.

Another embodiment of the present invention is a method of forming a preform for use in reinforced composite materials. The preform is formed to have a three-dimensional weave architecture with weft fibers woven to provide layer-to-layer interlocking of layers of warp fiber as well as interlocking of fibers within each layer. Although exemplary embodiments described herein involve layer-to-layer interlocking, this is not necessary for the practice of the invention. Some of the layers of the preform may be without layer-to-layer interlocking. The woven preform transfers out-of-plane loading through directed fibers to minimize inter-laminar tension. The preform has a base and one or more legs extending from the base, the base and the one or more legs each having at least two layers of warp fibers. The weft fibers follow a weave sequence that carries them through a portion of the base, then into the legs, and finally through the opposite portion of the base. The legs can be connected at a symmetrical or asymmetrical, distributed-column intersection, with an even or odd number of columns of warp fibers being located between the legs. The preform may have equal or unequal leg lengths and/or heights. The legs may be perpendicular or non-perpendicular or angled to the base. The legs may be parallel or angled to each other, and/or may have a variable width clevis in between. One or more legs may move in a sinusoidal, zig-zag, diagonal, curved or non-linear fashion in the warp and/or weft direction. The outer ends of the base and/or the legs preferably have tapers formed from terminating layers of warp fibers in a stepped pattern.

For a better understanding of the invention, its operating advantages and specific objects attained by its uses, reference is made to the accompanying descriptive matter in which preferred, but non-limiting, embodiments of the invention are illustrated.

Terms "comprising" and "comprises" in this disclosure can mean "including" and "includes" or can have the meaning commonly given to the term "comprising" or "comprises" in U.S. Patent Law. Terms "consisting essentially of" or "consists essentially of" if used in the claims have the meaning ascribed to them in U.S. Patent Law. Other aspects of the invention are described in or are obvious from (and within the ambit of the invention) the following disclosure.

BRIEF DESCRIPTION OF THE DRAWINGS

The accompanying drawings, which are included to provide a further understanding of the invention, are incorporated in and constitute a part of this specification. The drawings presented herein illustrate different embodiments of the invention and together with the description serve to explain the principles of the invention. In the drawings.

DETAILED DESCRIPTION OF THE PREFERRED EMBODIMENTS

Figure 1:
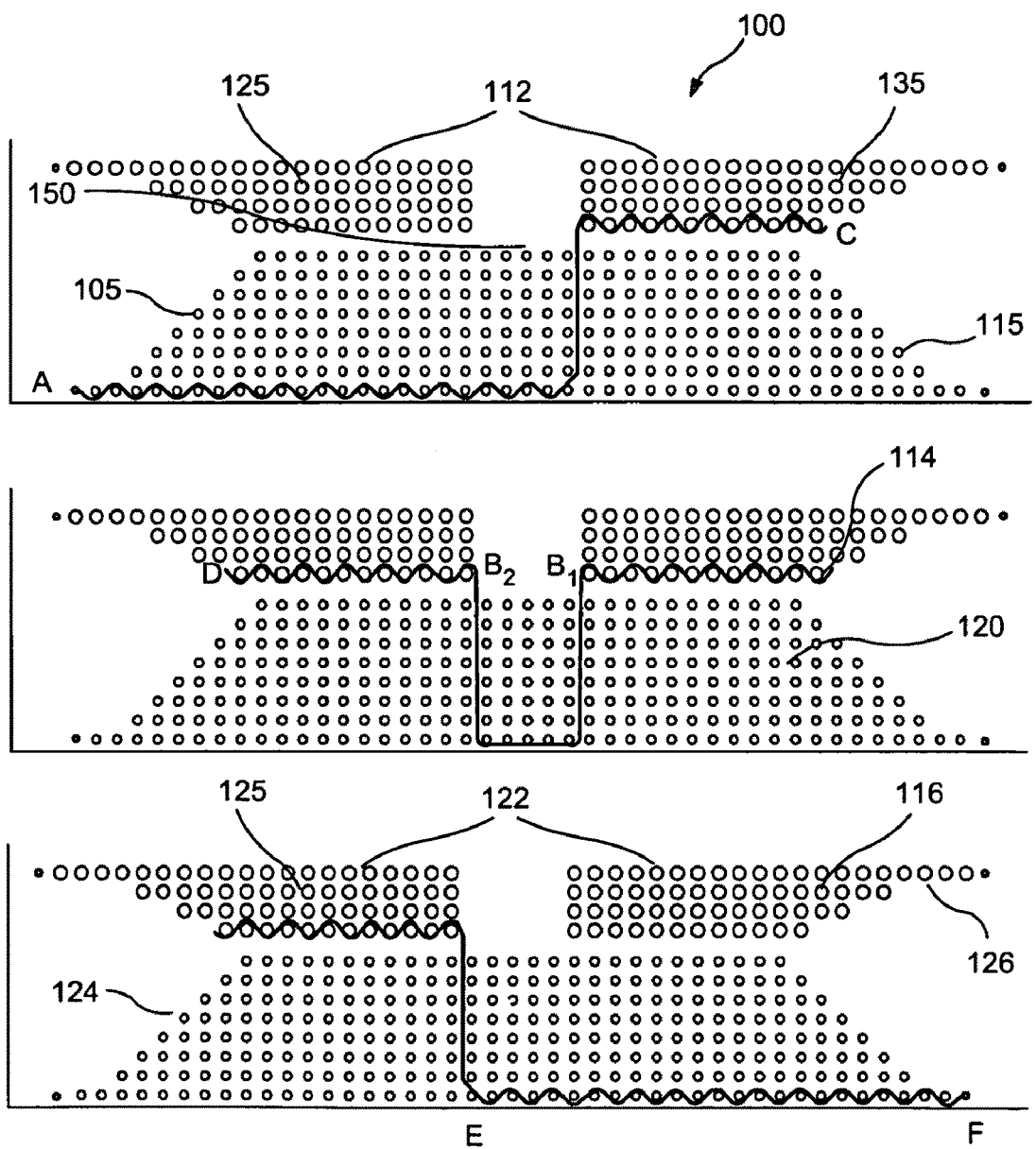
FIG. 1 is a schematic end view of a Pi-shaped preform depicting the formation of full-picks and fiber architecture therein, according to one exemplary embodiment of the invention.
Figure 2A:
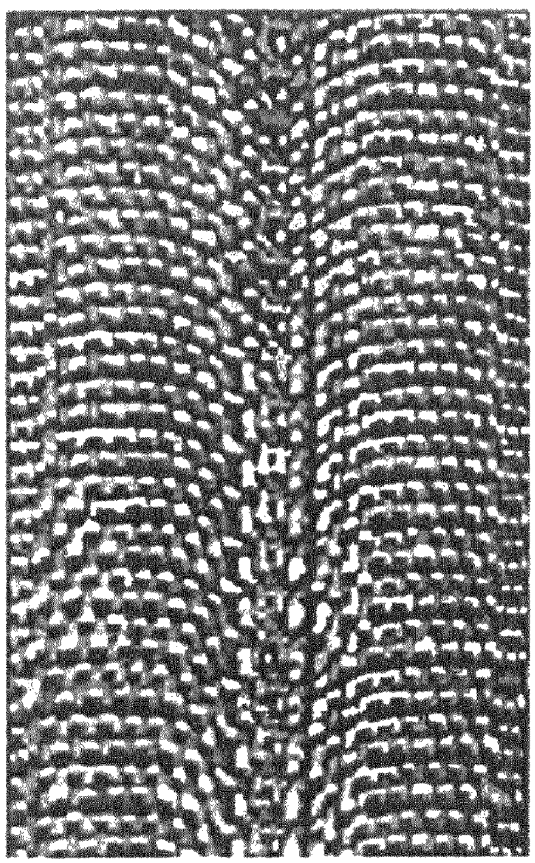
FIGS. 2(a) & 2(b) show a preform according to one exemplary embodiment of the invention and a preform as disclosed in a prior art, respectively.
Figure 3:
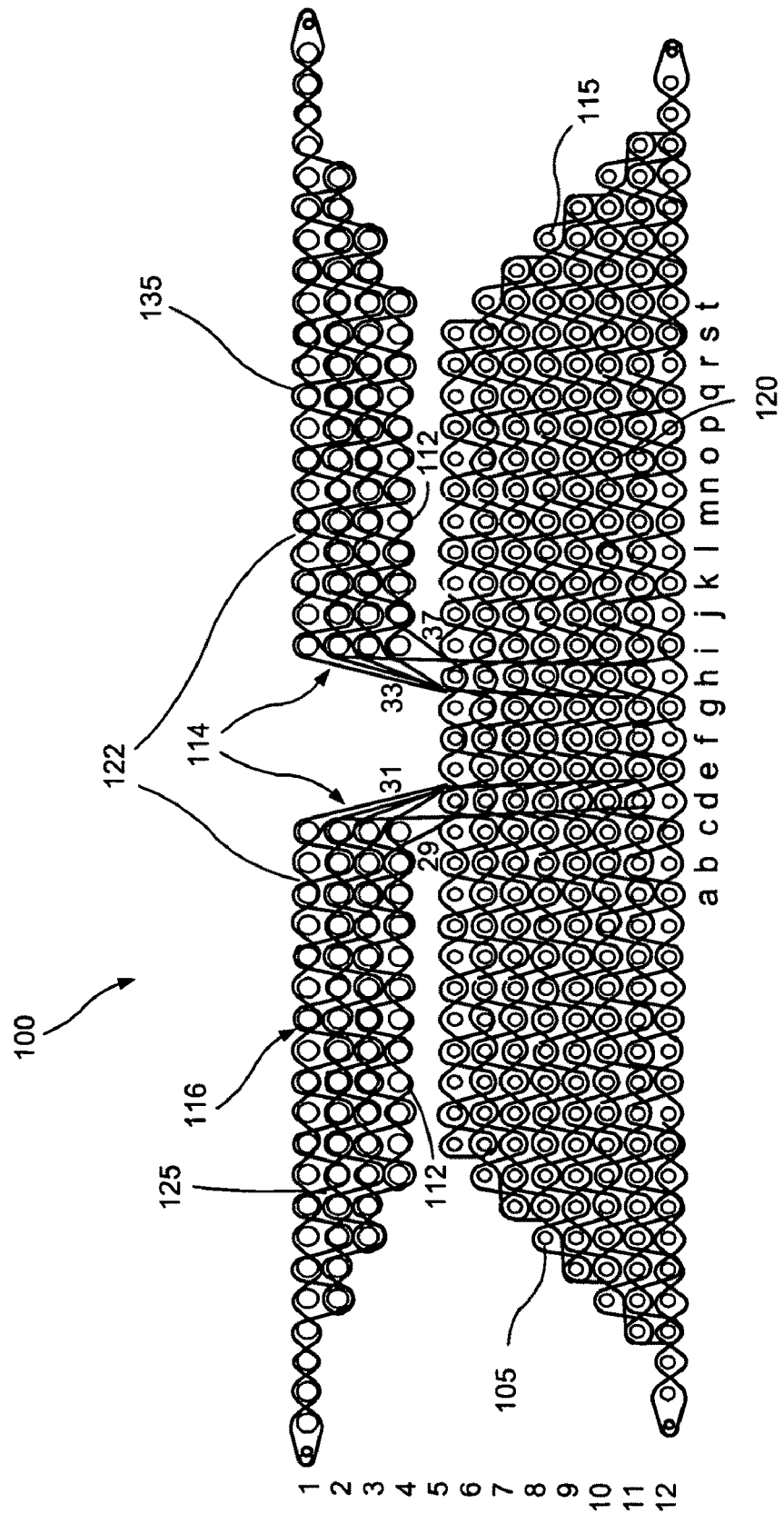
FIG. 3 is a schematic end view of a Pi-shaped preform depicting the fiber architecture therein, according to one exemplary embodiment of the invention.

FIGS. 1, 2a, 3 and 4 illustrate preferred embodiments of a three-dimensional preform 100. Preform 100 is formed by weaving one or more weft fibers 114 in a pattern through a plurality of warp fibers 116 which extend perpendicularly to the plane of the pattern. In FIGS. 1 and 3, the complete pattern used to form Pi-shaped preform 100 is illustrated, where weft fibers 114 are shown in the viewing plane, whereas warp fibers 116 are shown as perpendicular to the viewing plane. Fibers 114, 116 are shown as spaced apart in the schematic views of the architecture, though fibers 114, 116 are compacted together when actually woven into a completed preform 100.

Turning now to FIG. 1, all warp fibers 116 in preform 100 are generally parallel to each other, with slight undulations along the longitudinal length of each fiber 116, and are arranged in generally vertical columns. Preform 100 is preferably woven from materials used for typical composite structures, for example, fiberglass, aramid and carbon fibers, and according to one exemplary embodiment is woven to have a base 120 and two legs 125, 135 extending from base 120, forming a Pi-shaped profile. The legs 125, 135 may be perpendicular or non-perpendicular or angled to the base 120. Base 120 and legs 125, 135 each comprise at least two layers of warp fibers 116 and are shown as having optional tapered edges. For ease of weaving, preform 100 is woven with legs 125, 135 laid over against base 120, though legs 125, 135 are intended for use in an upright position, forming a clevis 150, such as, for example shown in FIG. 4. Base 120 is shown having eight layers of warp fibers 116, and legs 125, 135 are shown having four layers of warp fibers 116. Although eight and four layers are used for the base and the legs respectively in this example, the invention may not be limited as such, as any number of layers may be used for the base and legs.

Optionally, as shown, warp fibers 116 in base 120 have a smaller cross-sectional area than warp fibers 116 in legs 125, 135. By using smaller warp fibers 116 only in base 120 and not in legs 125, 135, the increase in time required to weave the architecture on a weaving loom is minimized while still providing a stronger base 120 in preform 100 through a greater amount of interlocking of warp fibers 116.

Referring again to FIG. 1, preform 100 is illustrated with the weave pattern beginning at one end 105 of the base 120, which is shown at the left of base 120. In a typical portion of the weave sequence, weft fiber 114 alternates over and under warp fibers 116 of one layer during each rightward pass, interlocking fibers 116 of that layer. Also, in a typical portion of the weave sequence, weft fiber 114 alternates over and under warp fibers 116 of two adjacent layers during each leftward pass, interlocking the layers to each other. Although exemplary embodiments described herein involve layer-to-layer interlocking, this is not necessary for the practice of the invention. Some of the layers of the preform may be without layer-to-layer interlocking. As shown in the figures and described below, portions of the weave sequence, including those within legs 125, 135, at edges, and at outer surfaces of preform 100, may differ from this weave sequence.

As shown in FIG. 1, the general weave sequence begins with weft fiber 114 at position A and extending toward the center of the base 120 and then into an outer side 112 of one of the legs 135 at position B1. The weft fiber 114 then extends to position C at the far right end right of leg 135. From position C, weft fiber 114 weaves back along the same line, toward the center of base, from which point weft fiber 114 extends downward into base 120 and back into the outer side 112 of the other leg 125 to position D at the far most left end of leg 125. Weft fiber 114 then weaves back along the same line, toward the center of base 120 and extends back into base 120 at position B2, passes through central columns of warp fibers 116 located between legs 125, 135, then back into base 120 at position E and reaches position F at the other end 115 of base 120. This forms a complete weave sequence of weft fiber 114, which basically combines four half-picks together with three full-picks, as depicted in FIG. 1. Terminating layers of warp fibers 116 in a stepped pattern form tapered edges on base 120 and legs 125, 135, such as taper 124 on the left lateral edge of base 120 and taper 126 on leg 135.

To complete one unit cell, or vertical section, the passes of weft fiber 114 across preform 100 are repeated for adjacent layers of warp fibers 116 until all layers are interlocked. The weft pattern is repeated to form adjacent vertical sections, creating continuous lengths of the preform. The interlocking of the layers is, however, not necessary, and the base 120 and/or the legs 125, 135 of the preform 100 may be bifurcated into separate layers.

FIG. 3 particularly shows the weave pattern used for forming legs 125, 135 and base 120 in a Pi-shaped preform 100. Base 120 is shown with eight layers of warp fibers 116, and legs 125, 135 are shown with four layers of warp fibers 116, though the pattern can be modified to work with more or fewer layers of warp fibers in base 120 and legs 125, 135. In other words, the base 120 can have more layers than each of the legs 125, 135 or vice versa. The weave pattern provides for interlocking of warp fibers 116 within a layer, and interlocking between layers of warp fibers. Adjacent layers are interlocked by running a portion of weft fibers 114 over a warp fiber 116 in a first layer in a first column and below a warp fiber in an adjacent, second layer in an adjacent, second column, the second layer being below the first layer. Legs 125, 135 are woven in a laid-over, horizontal position, as shown, while the pattern is woven. During installation, each leg 125, 135 is moved to a vertical, standing position, the width of each leg 125, 135 when standing upright comprising four layers.

Preform 100 is improved from previous woven preforms in providing a highly symmetrical, distributed intersection of legs 125, 135 with base 120. Base 120 has three central columns of warp fibers, and two separator columns of warp fibers, which are the adjacent columns to either lateral side of central columns. The use of an odd number of central columns allows the weave to form an approximately mirror image to either lateral side of a central plane of symmetry bisecting the central column, improving the symmetry of load distribution within base 120. While shown as having three central columns, the preferred embodiment of preform 100 may have any number of central columns, the number of central columns determining the nominal width of the clevis 150 formed when legs 125, 135 are in an upstanding position. The legs 125, 135 may be perpendicular or non-perpendicular or angled to the base 120. Similarly, the legs 125, 135 may be parallel or angled to each other and/or may have equal or unequal lengths and/or heights.

To symmetrically introduce loads from legs 125, 135 into base 120, such as loads from a member (not shown) bonded between upstanding legs 125, 135, the portions of weft fibers 114 connecting legs 125, 135 are divided into groups of equal or substantially equal numbers of fiber portions. Each group intersects base 120 between one of the separator columns and central columns or between one of the separator columns and the remaining right or left lateral columns adjacent that separator column. For example, as shown in FIG. 3, group 29 extends between layers 2 and 4 of leg 125 and base 120, intersecting base 120 between columns c and d. Likewise, group 31 intersects base 120 between columns d and e, group 33 intersects base 120 between columns g and h, and group 37 intersects base 120 between columns h and i. It is to be noted here that although the figures show symmetric geometries, the method of the instant invention may be used in producing asymmetric configurations as well.

Though shown in the preferred location at approximately the center of preform 100, the central column may comprise columns of warp fibers 116 located laterally from the center of preform 100. For example, columns b, c, and d may comprise the central columns, and columns a and e may act as the separator columns. This offsets legs 125, 135 toward an outer edge of base 120, though still providing symmetry in the weave of base 120 about columns b, c, and d and providing the symmetrical distribution of the load from legs 125, 135 into base 120. Tapers, such as tapers 124 and taper 126 are formed on an outer edge of a preform by terminating successive layers of warp fibers at lengths that are shorter than prior layers. For example, FIG. 3 shows layer 5 terminating at column s, whereas layer 6 terminates at column t, layer 5 being one warp fiber 116 shorter than layer 6. Likewise, layer 6 is shorter than layer 7, and this pattern repeats for each adjacent lower layer. A preform having tapered edges in either the base or upstanding legs has a better resistance to peel loads than a preform in which the warp-fiber layers all terminate at the same length. In addition, use of a smaller fiber size for the warp taper fiber provides a smoother, more gradual transition from the preform to a component to which it is joined. The weave pattern in FIG. 3 is for the eight layers of warp fibers 116 of base 120.

Figure 2B:
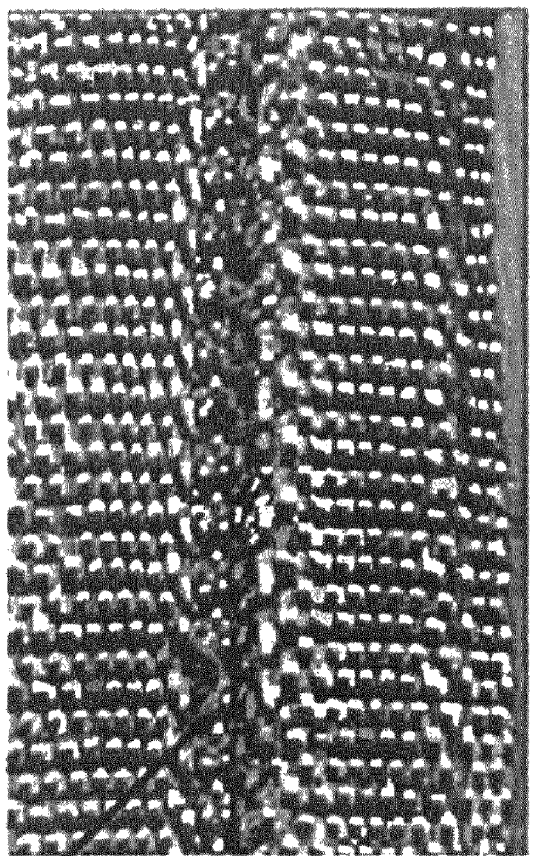
Figure 4:
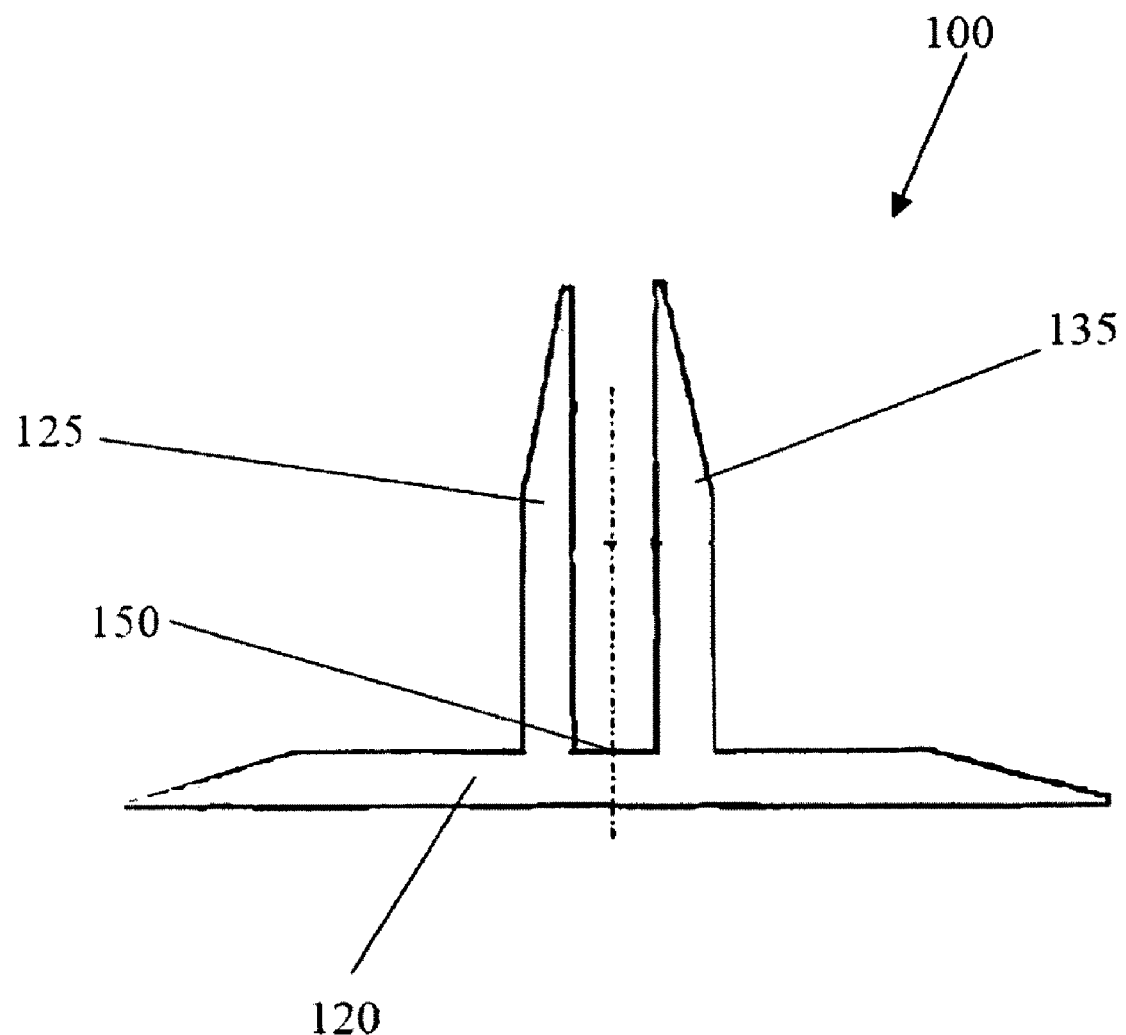
FIG. 4 is a schematic cross-sectional view of a Pi-shaped preform with legs in an upstanding position, according to one exemplary embodiment of the invention.

A completed, woven, Pi-shaped preform 100 is shown in FIG. 4 with legs 125, 135 in the vertical position, forming a clevis 150 between legs 125, 135. However, the legs 125, 135 may be perpendicular or non-perpendicular or angled to base 120. Preform 100 is woven by repeating the complete weave sequence to form adjacent vertical sections along the longitudinal length of preform 100. The weave process produces continuous lengths of preform 100, which are then cut to the desired lengths for installation. An example of a preform formed according to the invention in comparison with a prior art design preform 10 with loops 30 between the upstanding legs is shown in FIGS. 2(a) & 2(b), respectively.

The invention according to one exemplary embodiment is a method for weaving a preform 200 with multiple legs 225, 235 such that these legs are not necessarily linear in the warp and/or weft direction. In one exemplary embodiment, the legs may move in a sinusoidal, zig-zag, diagonal, curved or non-linear fashion or a combination thereof in the warp and/or weft direction. The width of the clevis 250 may vary depending on the application. In some instances, the preform may have a zero width clevis, i.e. the layers that form the preform may intersect each other at locations where they interchange positions, however, the layers may not necessarily be interwoven together in any portion of the preform. This feature, however, is not essential to the proper functioning of the invention and may or may not be used depending on the end use of the preform. The shift in the position of the legs, according to this embodiment, may be achieved by selectively dropping some warp fibers 216 out of the parts of the preform that form the upstanding legs 225, 235, while simultaneously adding warp fibers 216 in other areas. For instance, to move the legs to the left in a weft direction, warp fibers 216 are dropped out at the base of one of the upstanding legs 225 and simultaneously added at the base of the adjacent upstanding leg 235. Similarly, the opposite may be done to move the legs to the right. Although exemplary embodiments described herein have legs formed in the warp direction, the legs may be formed in the weft direction by selectively adding or dropping weft fibers from one or more legs. In such a case, the warp fibers may be used provide layer-to-layer interlocking instead of the weft fibers. However, this is not necessary for the practice of the invention. Some of the layers of the preform may be without layer-to-layer interlocking.

Figure 5:
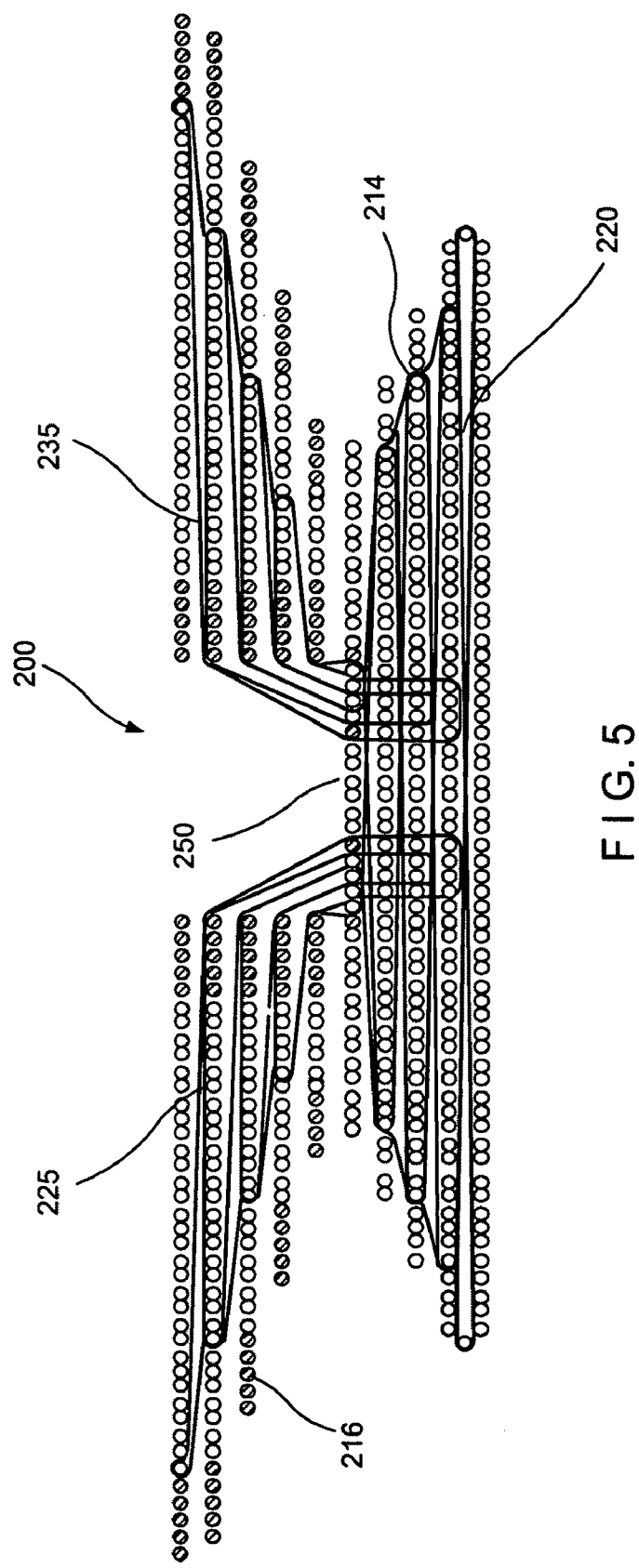
FIG. 5 is a schematic end view of a weave pattern or fiber architecture of a Pi-shaped preform, according to one exemplary embodiment of the invention.

FIG. 5 shows a cross section of the fiber architecture of the preform 200 that is perpendicular to the warp fibers 216. Individual warp fibers 216 are shown as circles, and the path of the continuous weft fiber 214 is shown as a solid line. It must be noted here that the majority of the fiber that forms the upstanding legs 225, 235 is continuous along the full length of the preform 200. Only the fibers 240 at the edges are discontinuous. These fibers 240 float above or below the woven portion of the preform 200, and are trimmed off after the preform has been removed from the loom. The upstanding legs 225, 235, according to this embodiment, can be moved to practically any location of the supporting flange or base 220, and are tied into the flange or base 220 by the weft fibers 214. However, the position must change in a stepwise manner, where the minimum width of a step is the width of one warp column. Preform 200 can be woven using any convenient pattern for the warp fiber i.e. ply-to-ply, through thickness angle interlock, orthogonal etc.

The invention according to one embodiment is a method for weaving a fiber preform 300 with multiple legs 305, 310, 315, 320 that are arranged such that the preform has a uniform width flange that is straight along the length of the preform 300 and one or more legs 315, 320 are perpendicular to the flange, but follow a curved path along the length of the preform 300. The warp and weft fibers can be woven as discussed in the above embodiments or they can simply be woven in a plain weave pattern to form the different layers. Although exemplary embodiments described herein have legs formed in the warp direction, the legs may be formed in the weft direction by selectively adding or dropping weft fibers from one or more legs. In such a case, the warp fibers may be used provide layer-to-layer interlocking instead of the weft fibers. However, this is not necessary for the practice of the invention. Some of the layers of the preform may be without layer-to-layer interlocking.

Figure 6A:
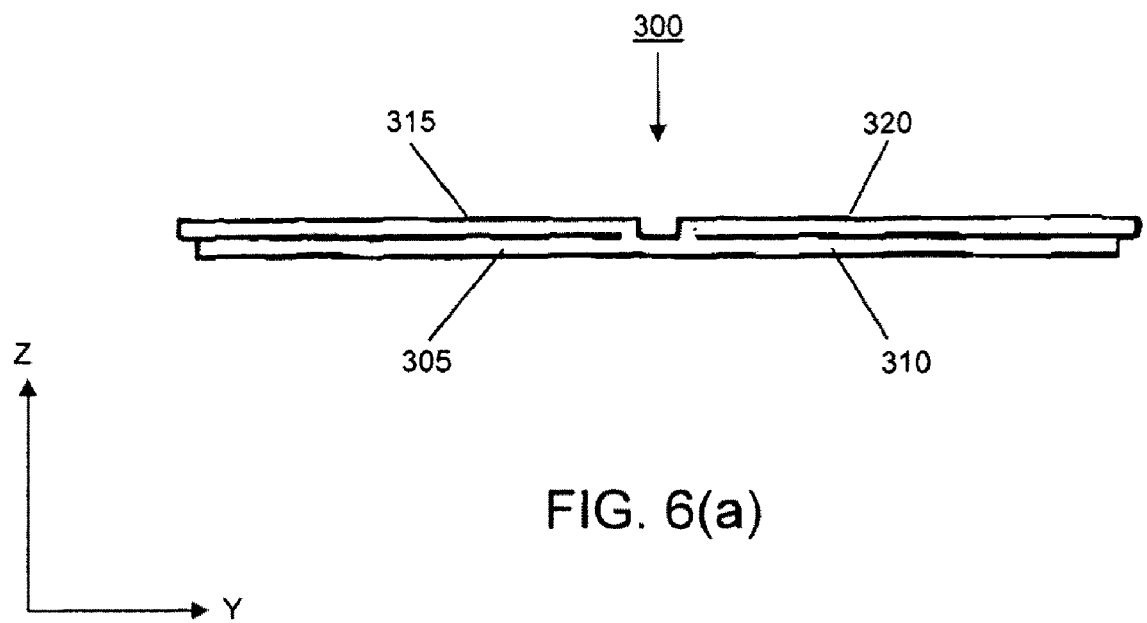
FIGS. 6(a) & 6(b) are schematic cross-sectional views of a Pi-shaped preform, according to one exemplary embodiment of the invention.
Figure 6B:
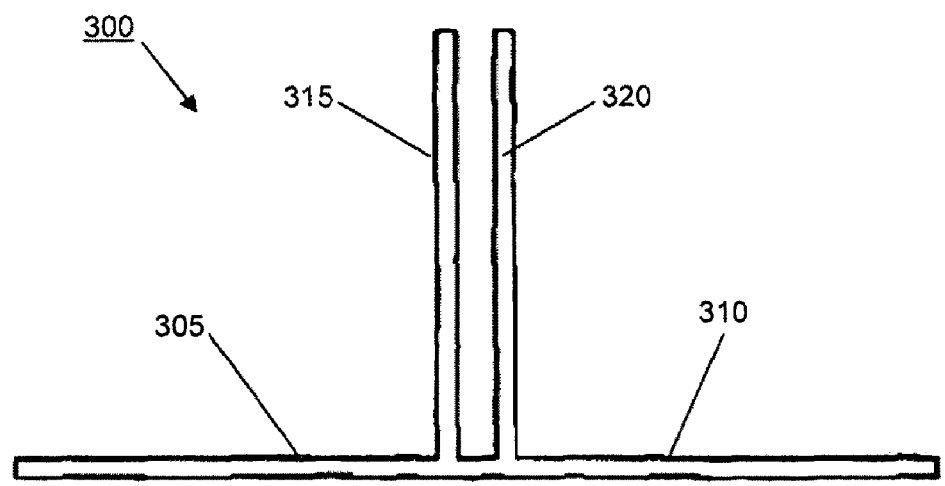
Figure 6C:
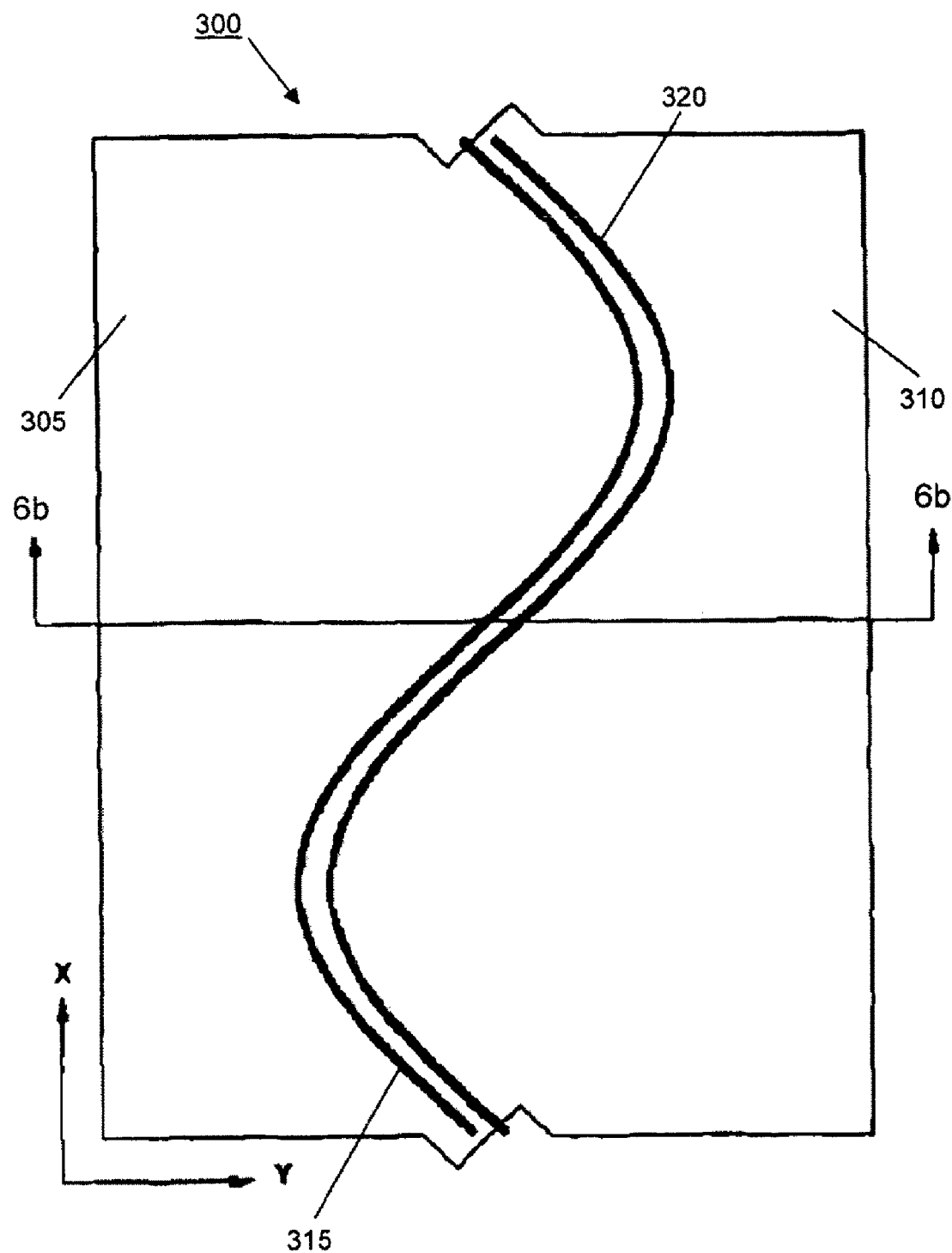
FIG. 6(c) is a schematic top view of a woven preform with sine wave legs in an upstanding position, according to one exemplary embodiment of the invention.

An exemplary embodiment of the invention is shown in FIGS. 6(a)-6(c). FIG. 6(a) depicts a cross-sectional view of the preform 300 as woven, according to this exemplary embodiment. The preform 300 may be initially woven flat with four legs 305, 310, 315, and 320 layered on top of one another, parallel to the X-Y plane, as shown in FIG. 6(a). Legs 315 and 320 can be folded up relative to legs 305 and 310 respectively, such that legs 315 and 320 are now in an upright position as shown in FIG. 6(b), thereby forming a "Pi" configuration. In this example, legs 305 and 310 form the straight flange or the base, and legs 315 and 320 may follow, for example, a sine wave path, relative to the straight flange, as depicted in FIG. 6(c).

Figure 7A:
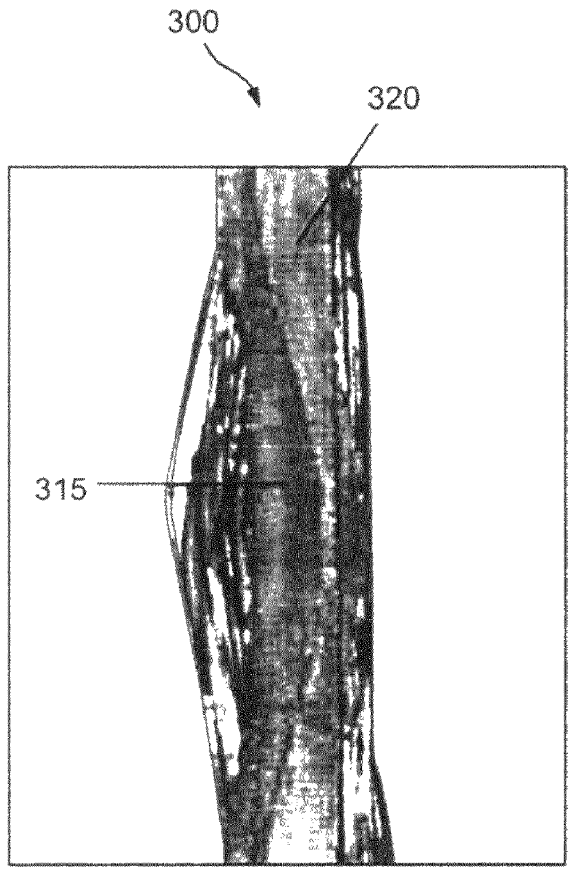
FIGS. 7(a) & 7(b) are views of a Pi-shaped preform with legs in a sine wave configuration before float trimming, according to one exemplary embodiment of the invention.
Figure 7B:
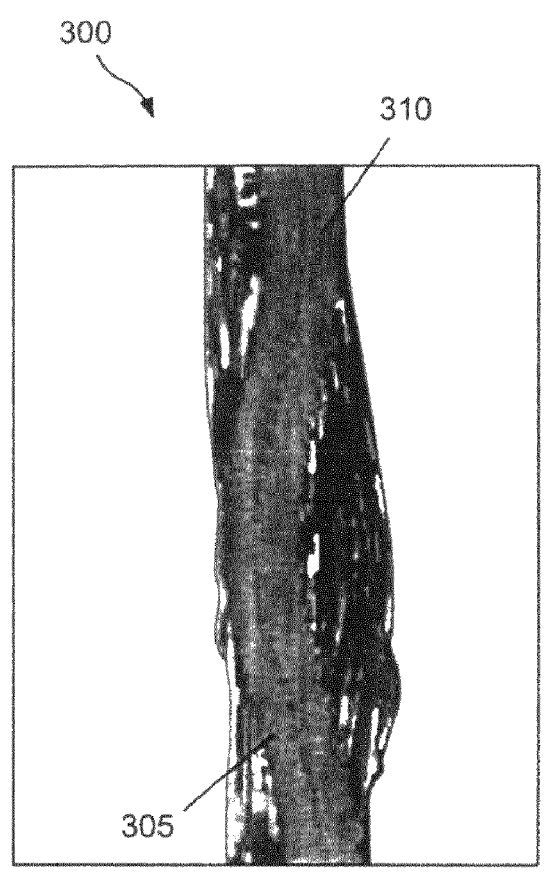
Figure 7C:
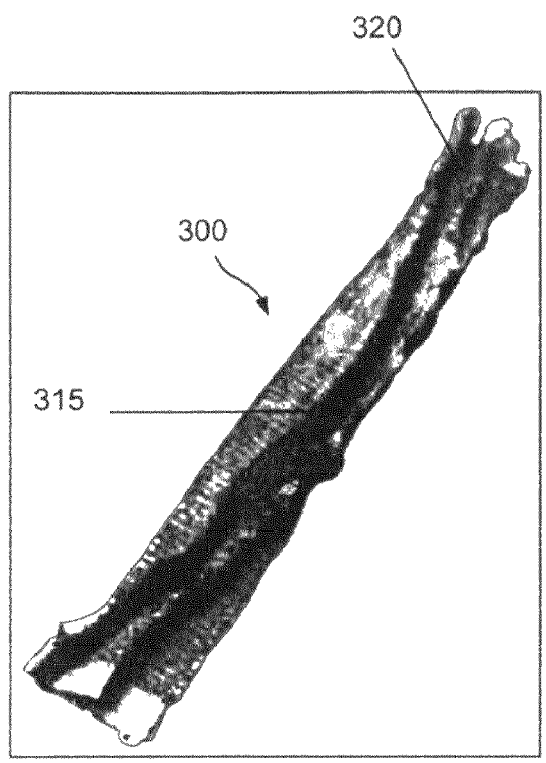
FIGS. 7(c) & 7(d) are views of a Pi-shaped preform with legs in a sine wave configuration after float trimming, according to one exemplary embodiment of the invention.
Figure 7D:
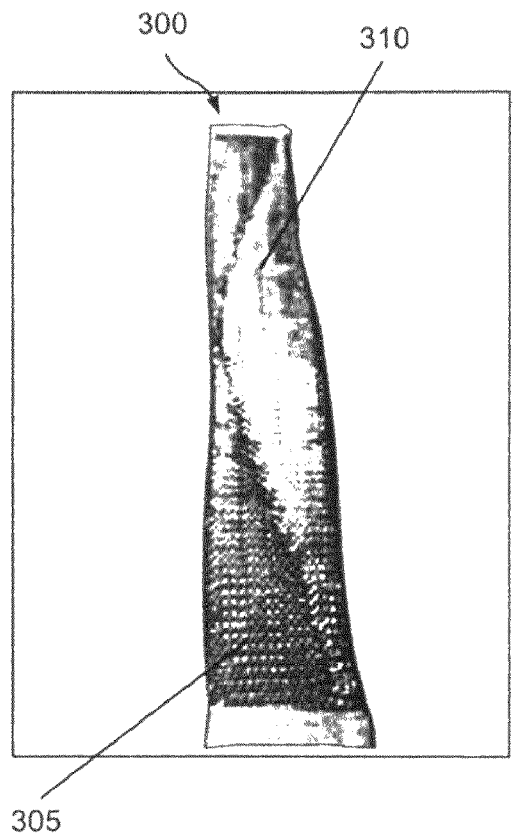

Different views of a Pi-shaped preform with a ply-to-ply architecture with legs moving along a sine wave in the warp direction are shown in FIGS. 7(a)-(d). FIG. 7(a) is a top view of preform 300 as woven, before trimming of floating fibers, with legs 315 and 320 on top. FIG. 7(b) is a top view of preform 300 as woven, before trimming of floating fibers, with legs 305 and 315 on top. FIG. 7(c) is a top view of preform 300 as folded with upstanding legs 315 and 320, after trimming of floating fibers. FIG. 7(d) is a top view of preform 300 as folded with legs 305 and 310 showing as forming a flange, after trimming of floating fibers.

One exemplary embodiment of the invention is a method of forming a woven preform by weaving warp fibers with weft fibers to form a base and one or more legs extending from the base by selectively dropping one or more weft fibers out of a first leg and/or selectively adding one or more weft fibers into the first leg, thereby moving the first leg a predetermined distance in the warp direction. The method may also include simultaneously adding and/or removing weft fibers in a second leg, thereby simultaneously moving the second leg a predetermined distance in the warp direction. This process of adding or removing weft fibers may be repeated to form the one or more legs along a curve in the weft direction. The one or more legs may be formed in a sine wave, zig-zag, diagonal, curved or non-linear configuration or combinations thereof in the weft direction.

One exemplary embodiment of the invention is a woven preform having weft fibers woven with the layers of warp fibers to form a base and one or more legs extending from the base, where one or more weft fibers are selectively dropped out of a first portion of the preform that forms a first leg and/or one or more weft fibers are selectively added into the first portion of the preform, thereby moving the first leg a predetermined distance in the warp direction. The one or more legs are formed in a sine wave, zig-zag, diagonal, curved or non-linear configuration or combinations thereof in the weft direction.

Figure 9:
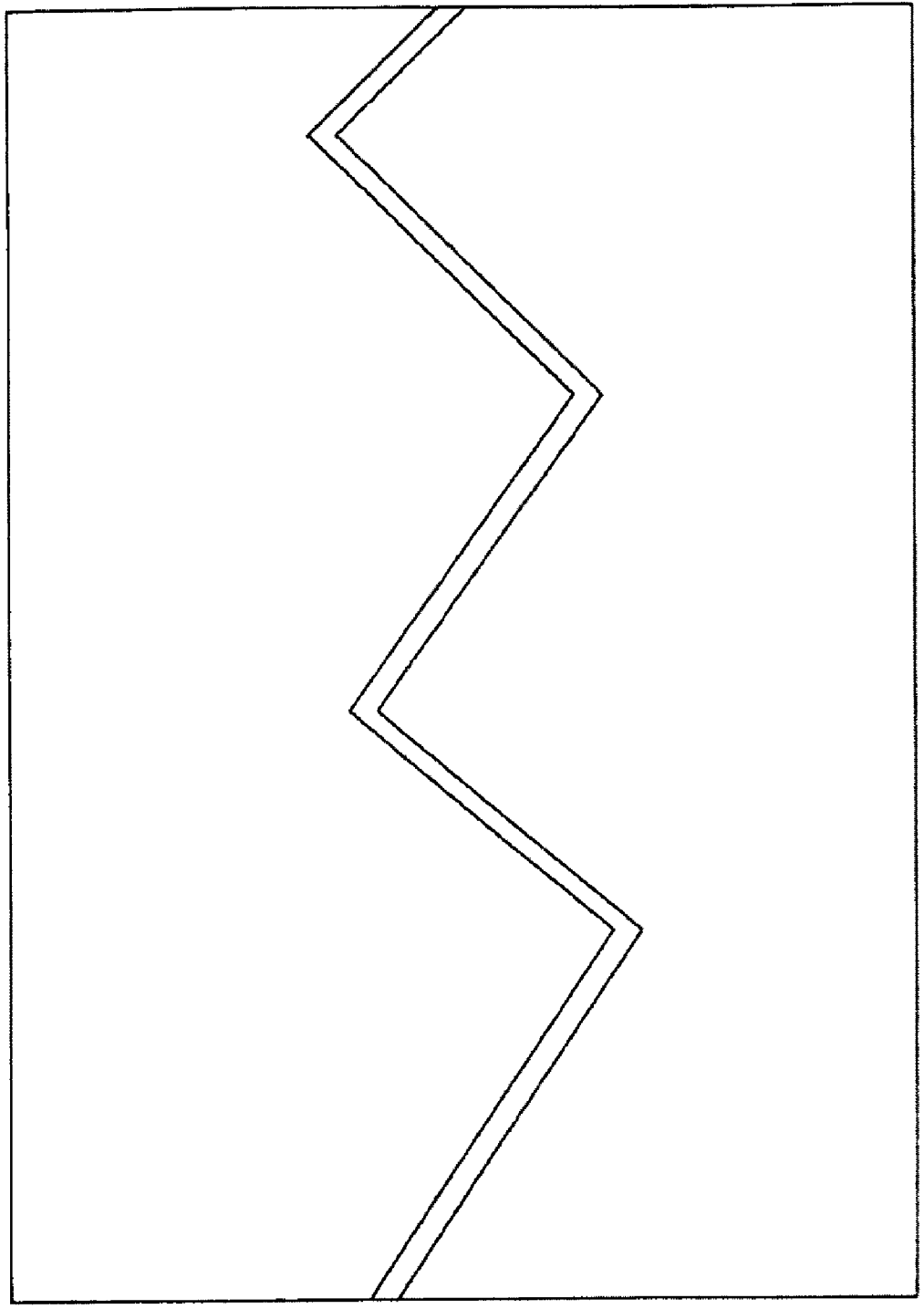
FIG. 9 is a schematic top view of a woven Pi-shaped preform with legs in a zig-zag fashion, according to one exemplary embodiment of the invention.
Figure 10:
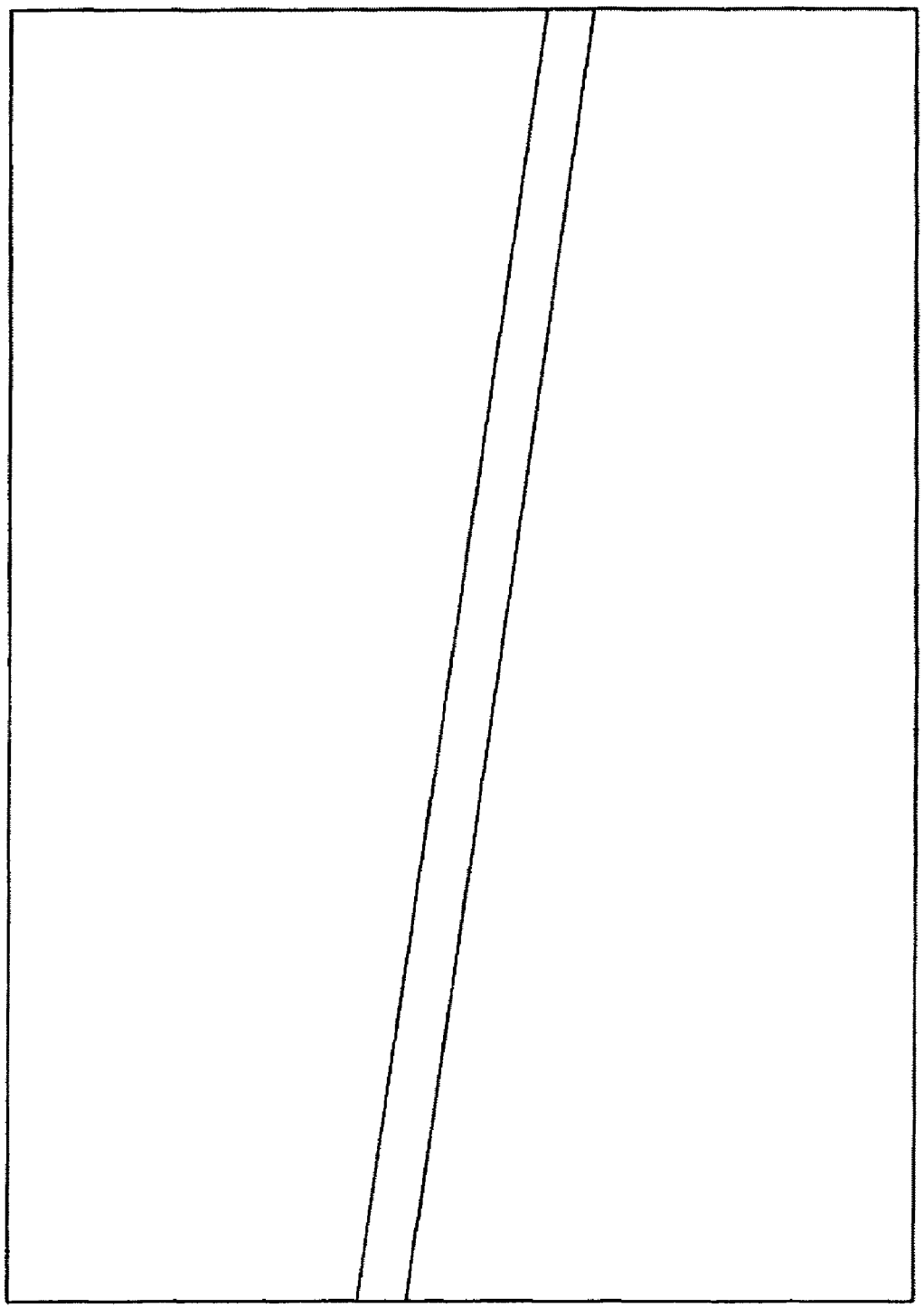
FIG. 10 is a schematic top view of a woven Pi-shaped preform with legs in a diagonal fashion, according to one exemplary embodiment of the invention.

Although a sine wave Pi preform is discussed in the above embodiment, the invention is not limited to such shapes. For example, the preform may be formed with upstanding legs 315 and 320 moving in a zig-zag, diagonal, curved or non-linear fashion or a combination thereof in the warp and/or weft direction. Some examples of these shapes are depicted in FIGS. 9 & 10.

Preforms such as this may be used in composite structures to reinforce joints and to build preforms for more complicated structures such as spars and ribs in aircrafts. An example of how a Pi preform 300 can be used to build a composite I-beam 350 is shown in FIG. 8.

Figure 8:
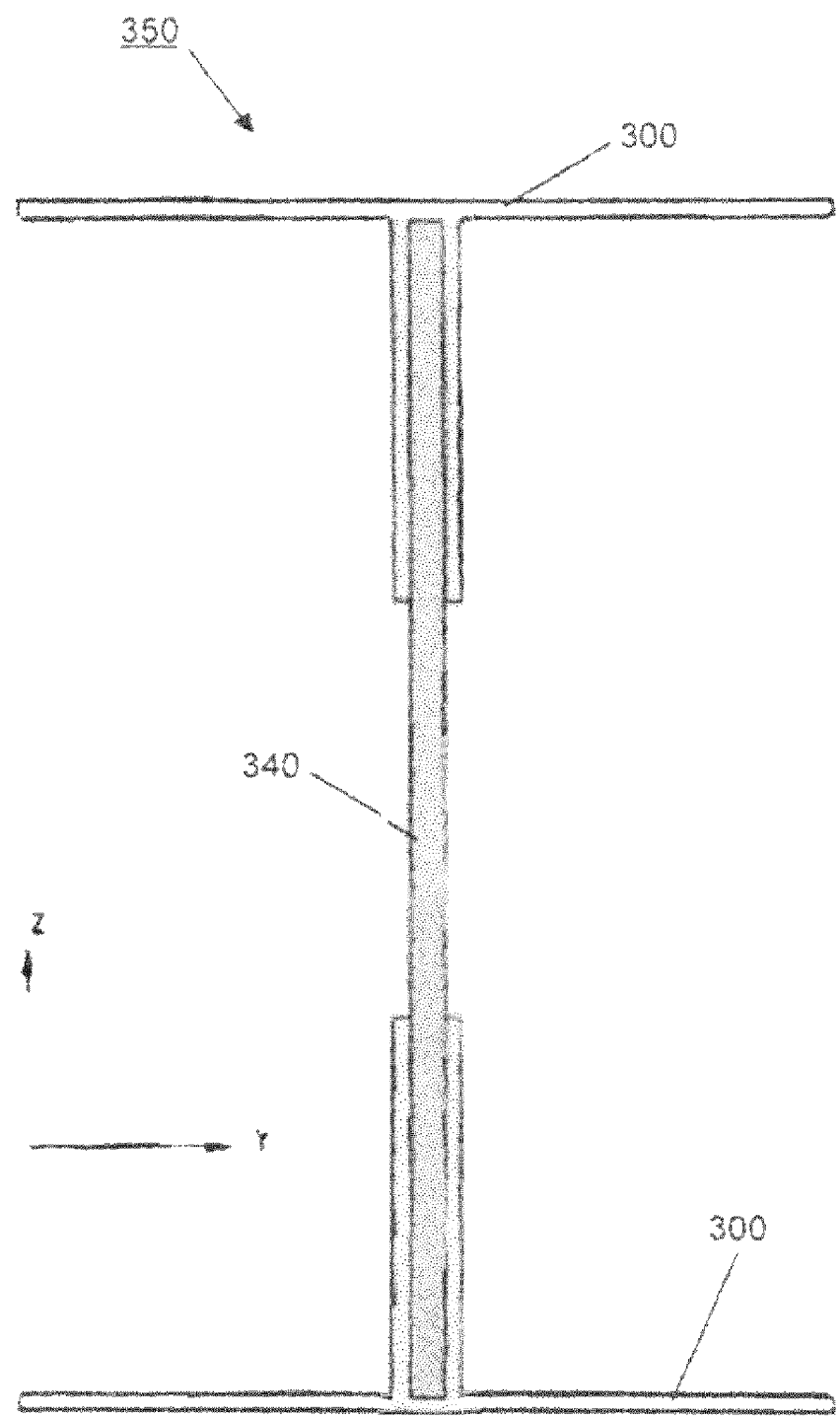
FIG. 8 is a schematic cross-sectional view of a composite I-beam using two Pi-shaped woven preforms, according to one exemplary embodiment of the invention.

A principle mode of failure for the structure shown in FIG. 8 is buckling of the web 340 between the two Pi flanges 300 when the beam 350 is put into bending or into compression in the Z direction. A preferred way to improve the buckling strength of this type of structure, according to one embodiment of the invention, is to form the web 340 into a sine wave shape in the X direction. This provides geometric stiffening that substantially increases the buckling load with only a slight increase in weight. Composite sine wave spars and ribs fabricated from conventional pre-pregs have been used in construction of aircraft. However, they require a significant amount of manual labor to dart and fold plies that wrap from the web into the upper and lower flanges. The present invention, therefore, solves this problem by weaving the upstanding legs of the Pi into a sine wave shape. The web 340 can now be fabricated from a rectangular strip of material that easily forms into the sine wave shape and fits between the upstanding legs 315, 320 connected to the flanges or base.

The instant method can also be used for making other cross-sectional shapes such as a 'T' shape or 'T' stiffener that has the blade of the 'T' running in a sinusoidal fashion relative to the top of the 'T' or other shapes such as preforms having three or more legs. The instant method can be used to weave preforms with variable thickness or variable length/height legs that may be parallel or angled to each other in one or more planes. The preform can be woven using any convenient weave pattern, i.e., ply-to-ply, through thickness angle interlock, orthogonal, etc. While carbon fiber is preferred, the invention is applicable to practically any other fiber type, such as for example, glass, ceramic, aramid, polyethylene, polypropylene etc. As shown in the FIGS. 1, 2(a), 3, and 7(a)-(d), the weft fibers can weave in a plain weave pattern, for example, however practically any weave pattern can be used to form the preform. The warp fibers can be providing the interlocking rather than the weft. Although exemplary embodiments described herein involve layer-to-layer interlocking, this is not necessary for the practice of the invention. Some of the layers of the preform may be without layer-to-layer interlocking. Also, in practice, the legs can consist of any number of layers of interlocking fabric and the legs can include tapered ends instead of flat ends, i.e. the outer ends of the base and/or the legs may have tapers formed from terminating layers of warp fibers in a stepped pattern.

Typically, the preforms are woven using one type of fiber, for example, carbon (graphite) fibers, for both the warp and weft fibers. However, preforms may also be hybrid weave patterns that use fibers made from multiple materials, such as carbon and glass fibers. These patterns can result in preforms having higher toughness, reduced cost, and optimized thermal-expansion characteristics. The weave patterns comprise all warp fibers of one type and all weft fibers of another type, or the weave may have warp and/or weft fibers of alternating types arranged, for example, in a "checkerboard" pattern throughout the layers.

The advantages of the present invention include the ability to weave a high strength and easy-to-use preform for assembling components into structures. The improved weave interlocks the warp fibers of each layer and interlocks the layers to each other, while distributing loads through the preform in a highly symmetrical manner. Accordingly, the invention provides for an alternative approach and/or an improved method of creating 3D preforms and/or reinforced composite structures with multiple legs such that the legs are not necessarily linear in the warp and/or weft direction.

Thus by the present invention its objects and advantages are realized and although preferred embodiments have been disclosed and described in detail herein, its scope should not be limited thereby rather its scope should be determined by that of the appended claims.

What is claimed is:

1. A method of forming a woven preform, the method comprising the steps of:
    (a) providing a plurality of adjacent layers, each layer having a plurality of warp fibers, the warp fibers being parallel to each other;
    (b) weaving a plurality of weft fibers with the layers of warp fibers to form a base and one or more legs extending from the base; and
    (c) selectively dropping one or more warp fibers out of a first portion of the preform that forms a first leg and/or selectively adding one or more warp fibers into the first portion of the preform, thereby forming the one or more legs in a sine wave, zig-zag, diagonal, curved or non-linear configuration or combination thereof in the warp direction of the preform.

2. The method according to claim 1, further comprising the step of simultaneously adding and/or removing warp fibers in a second portion of the preform that forms a second leg, thereby simultaneously moving the second leg a predetermined distance in the weft direction.

3. The method according to claim 1, further comprising the step of repeating the step of adding or removing warp fibers, thereby forming the one or more legs in the warp direction.

4. The method according to claim 1, further comprising the step of folding the one or more legs relative to the base, thereby forming upstanding legs.

5. The method according to claim 2, wherein the base has more layers than each of the legs or vice versa.

6. The method according to claim 2, wherein edges of the base and/or the legs are formed tapered.

7. The method according to claim 2, wherein the legs are perpendicular or non-perpendicular or angled to the base.

8. The method according to claim 1, wherein the warp and weft fibers are made of glass, carbon, aramid, polyethylene, polypropylene or combinations thereof.

9. The method according to claim 2, wherein the legs are of equal or unequal lengths and/or heights.

10. The method according to claim 2, wherein the two or more legs are separated by a clevis of predetermined width.

11. The method according to claim 2, wherein the two or more legs are separated by a zero width clevis.

12. The method according to claim 2, wherein the legs are separated by a variable width clevis.

13. A woven preform for use in reinforced composite structures, the preform comprising:
    a plurality of adjacent layers, each layer having a plurality of warp fibers, the warp fibers being parallel to each other; and
    a plurality of weft fibers woven with the layers of warp fibers to form a base and one or more legs extending from the base, wherein
    one or more warp fibers are selectively dropped out of a first portion of the preform that forms a first leg and/or one or more warp fibers are selectively added into the first portion of the preform, thereby the one or more legs are in a sine wave, zig-zag, diagonal, curved or non-linear configuration or combination thereof in the warp direction of the preform.

14. The preform according to claim 13, wherein the one or more legs are folded relative to the base, thereby forming upstanding legs.

15. The preform according to claim 13, wherein the preform has two or more legs.

16. The preform according to claim 15, wherein the two or more legs are separated by a clevis of predetermined width.

17. The preform according to claim 15, wherein the two or more legs are separated by a zero width clevis.

18. The preform according to claim 15, wherein the base has more layers than each of the legs or vice versa.

19. The preform according to claim 15, wherein edges of the base and/or the legs are tapered.

20. The preform according to claim 15, wherein the legs are perpendicular or non-perpendicular or angled to the base.

21. The preform according to claim 13, wherein the warp and weft fibers are made of glass, carbon, aramid, polyethylene, polypropylene or combinations thereof.

22. The preform according to claim 15, wherein the legs are of equal or unequal lengths and/or heights.

23. The preform according to claim 15, wherein the legs are separated by a variable width clevis.

24. A method of forming a woven preform, the method comprising the steps of:
   (a) providing a plurality of adjacent layers, each layer having a plurality of warp fibers, the warp fibers being parallel to each other;
   (b) weaving a plurality of weft fibers with the layers of warp fibers to form a base and one or more legs extending from the base; and
   (c) selectively dropping one or more weft fibers out of a first portion of the preform that forms a first leg and/or selectively adding one or more weft fibers into the first portion of the preform, thereby forming the one or more legs in a sine wave, zig-zag, diagonal, curved or non-linear configuration or combination thereof in the weft direction of the preform.

25. The method according to claim 24, further comprising the step of simultaneously adding and/or removing weft fibers in a second portion of the preform that forms a second leg, thereby simultaneously moving the second leg a predetermined distance in the warp direction.

26. The method according to claim 24, further comprising the step of repeating the step of adding or removing weft fibers, thereby forming the one or more legs along a curve in the weft direction.

27. The method according to claim 24, further comprising the step of folding the one or more legs relative to the base, thereby forming upstanding legs.

28. The method according to claim 25, wherein the base has more layers than each of the legs or vice versa.

29. The method according to claim 25, wherein edges of the base and/or the legs are formed tapered.

30. The method according to claim 25, wherein the legs are perpendicular or non-perpendicular or angled to the base.

31. The method according to claim 24, wherein the warp and weft fibers are made of glass, carbon, aramid, polyethylene, polypropylene or combinations thereof.

32. The method according to claim 25, wherein the legs are of equal or unequal lengths and/or heights.

33. The method according to claim 25, wherein the two or more legs are separated by a clevis of predetermined width.

34. The method according to claim 25, wherein the two or more legs are separated by a zero width clevis.

35. The method according to claim 25, wherein the legs are separated by a variable width clevis.

36. A woven preform for use in reinforced composite structures, the preform comprising:
   a plurality of adjacent layers, each layer having a plurality of warp fibers, the warp fibers being parallel to each other; and
   a plurality of weft fibers woven with the layers of warp fibers to form a base and one or more legs extending from the base, wherein
   one or more weft fibers are selectively dropped out of a first portion of the preform that forms a first leg and/or one or more weft fibers are selectively added into the first portion of the preform, thereby forming the one or more legs in a sine wave, zig-zag, diagonal, curved or non-linear configuration or combination thereof in the weft direction of the preform.

37. The preform according to claim 36, wherein the one or more legs are folded relative to the base, thereby forming upstanding legs.

38. The preform according to claim 36, wherein the preform has two or more legs.

39. The preform according to claim 38, wherein the two or more legs are separated by a clevis of predetermined width.

40. The preform according to claim 38, wherein the two or more legs are separated by a zero width clevis.

41. The preform according to claim 38, wherein the base has more layers than each of the legs or vice versa.

42. The preform according to claim 38, wherein edges of the base and/or the legs are tapered.

43. The preform according to claim 38, wherein the legs are perpendicular or non-perpendicular or angled to the base.

44. The preform according to claim 36, wherein the warp and weft fibers are made of glass, carbon, aramid, polyethylene, polypropylene or combinations thereof.

45. The preform according to claim 38, wherein the legs are of equal or unequal lengths and/or heights.

46. The preform according to claim 38, wherein the legs are separated by a variable width clevis.

* * * * *